United States Patent [19]
Murakami et al.

[11] 3,821,750
[45] June 28, 1974

[54] INDICATING CIRCUIT FOR CAMERA VISUALLY INDICATING NEED FOR FLASH EXPOSURES AND PERIODS OF THE EXPOSURES

[75] Inventors: Takeshi Murakami; Yukio Nakamura, both of Chiba; Eiichi Onda, Saitama; Yukio Morino, Tokyo, all of Japan

[73] Assignee: Seiko Koki Kabushiki Kaisha, Tokyo, Japan

[22] Filed: Sept. 4, 1973

[21] Appl. No.: 393,840

Related U.S. Application Data
[63] Continuation of Ser. No. 231,697, March 3, 1972, abandoned.

[30] Foreign Application Priority Data
Mar. 4, 1971 Japan .............................. 46-11145

[52] U.S. Cl. ............................................. 95/10 CE
[51] Int. Cl. ................................................ G03b 7/08
[58] Field of Search ..................... 95/10 CE, 10 CT

[56] References Cited
UNITED STATES PATENTS

| | | | |
|---|---|---|---|
| 3,460,450 | 8/1969 | Ogihara ................................ | 95/10 |
| 3,535,991 | 10/1970 | Kitai .................................... | 95/10 X |
| 3,662,659 | 5/1972 | Metzger et al. ..................... | 95/10 |
| 3,672,267 | 6/1972 | Harvey et al. ....................... | 95/10 |

Primary Examiner—Samuel S. Matthews
Assistant Examiner—Michael L. Gellner
Attorney, Agent, or Firm—Robert E. Burns; Emmanuel J. Lobato; Bruce L. Adams

[57] ABSTRACT

A control circuit for use in a camera having an electrically operated shutter including a timing circuit that automatically controls the exposure time by applying a switching signal to a switching circuit that closes the shutter. The timing circuit includes a light-responsive device and develops the switching signal as a function of the brightness of the scene being photographed. A manually operated change-over switch selectively connects the timing circuit to the switching circuit for establishing a time exposure mode of operation for taking time exposures and disconnects the timing circuit from the switching circuit and connects a flash circuit into the control circuit for establishing a flash mode of operation. A connecting switch, actuated by the camera release, connects the light-responsive device to a warning and indicating circuit. When the change-over switch is set for the time exposure mode the light-responsive device applies a bias signal to a warning and indicating circuit which emits a warning signal to warn the camera user that there is insufficient light and that the flash mode of operation is necessary. A synchro-switch in the flash circuit, actuated by the release lever of the camera, is closed when the shutter is opened and is opened as the shutter closes. It controls the ignition of the flash device when the change-over switch is set for the flash mode, and controls the emission of the warning signal during the time the shutter is open, when the change-over switch is set for the time exposure mode.

3 Claims, 1 Drawing Figure

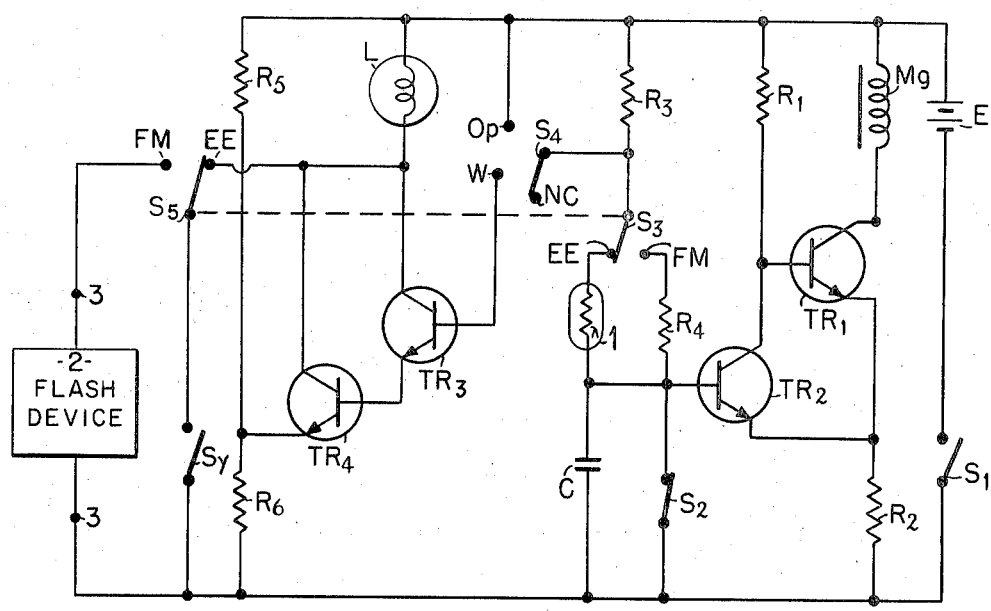

INDICATING CIRCUIT FOR CAMERA VISUALLY INDICATING NEED FOR FLASH EXPOSURES AND PERIODS OF THE EXPOSURES

BACKGROUND OF THE INVENTION

This invention relates generally to electric eye cameras and more particularly to built-in time exposure control circuits having length of time exposure indicating means.

Cameras with electrically controlled shutters having automatic exposure control either with a mechanical system or an electrical time exposure control circuit are well know. In these cameras the operator is generally unable to detect the closing of a shutter at the end of a time exposure since the shutter mechanism is generally very quiet in its operation. In effecting time exposures the operator generally feels uneasy since he has no way of knowing whether a time exposure has been completed or not. Thus he may move the camera while an exposure is still being taken or he may turn off the power switch prematurely thereby blurring the exposure.

In order to prevent these misoperations, cameras have been provided with circuitry that maintains the electric power switch in an "on" condition during the operation of the shutter or by the use of circuitry which develops a control signal at the end of the termination of an exposure. This control signal is used to release the release mechanism or release button of the camera so that it is restored to its initial position for taking of another photographic exposure only upon completion of an exposure. This latter type of system requires a locking system for locking the camera release mechanism, which is relatively complex and has relatively complex circuitry for applying the control signal.

In all of these constructions for avoiding misoperation during time exposures complicated circuitry is involved and additional mechanisms are required which raise costs of manufacture and further complicate the operation of this type of camera.

SUMMARY OF THE INVENTION

It is an object of the present invention to provide indicating circuitry that indicates visually to the camera user or operator that the shutter is still open effecting an exposure of the camera film.

Another object of the present invention is to provide indication to a camera user, by a visual means or warning signal, that a flash device should be used for effecting an exposure.

Still another object is to provide a time exposure control circuit making provisions for flash exposures and automatic time exposures indicating visually the existence of a condition in which the shutter is open during a period corresponding to the time exposure.

According to the invention a built-in control circuit for an electric eye camera has a switching circuit and a timing circuit in which a photo-conductive element is used for sensing the brightness of an object or field being photographed to control exposure time as a function of the brightness. The timing circuit has a changeover switch which allows the camera to be used on an automatic time exposure mode or flash photography mode.

An indicating and warning circuit is connected to the timing circuit and has a light visually indicating, when the brightness is to low, that a flash photograph should be taken and also indicates that the shutter is open during a time exposure. The light is turned off at the time of the completion of the exposure and the operator is accordingly visually advised of the open condition of the shutter during time exposures.

BRIEF DESCRIPTION OF THE DRAWING

The single drawing is a schematic of a built-in circuit for an electric eye camera.

Other objects and advantages of the circuit according to the invention will appear from the following description of an example of the invention, and the novel features will be particularly pointed out in the appended claims.

DESCRIPTION OF THE PREFERRED EMBODIMENT

A built-in circuit, for cameras having electrically controlled shutters, in the drawing has a power switch $S_1$ which is closed when a release lever of the camera is actuated by a camera release button, not shown, placing in circuit a power source E. A first switching circuit is energized by the power source and has an electromagnet Mg, not shown, that maintains the camera shutter open in a known manner. The release lever activates the shutter operating mechanism, not shown, to open the shutter and the switching circuit controls the current energizing the electromagnet Mg thereby maintaining the shutter open when the electromagnet Mg is energized and closing the shutter when the electromagnet Mg is deenergized closes the shutter. The electromagnet Mg is connected in series with a transistor $TR_1$ and a resistor $R_2$ across the circuit and parallel with a resistor $R_1$ in series with a second transistor $TR_2$ and the resistor $R_2$. The two transistors in the switching circuit are connected to the two parallel branches of the switching circuit in series as shown.

A time exposure control circuit is connected to the first switching circuit. This control circuit controls the time of the exposures, by controlling the energization of the operating coil electromagnet Mg, either in a flash mode of operation or in an automatic time exposure mode. The timing circuit comprises a light sensing element 1, for example a photoconductive cell, which senses the brightness of the object or field being photographed and its resistance or conductance changes proportionally to the light being sensed. The light-responsive cell 1 is connected in a voltage divider in series with a capacitor C and a change-over switch $S_3$ having its control or movable contact in series with a comparison resistor $R_3$. The change-over switch $S_3$ has a stationary contact EE for use when the change over switch $S_3$ is in a mode for automatically controlling a time exposure as a function of the brightness of the object or scene being photographed. The change-over switch $S_3$ is in the position illustrated in the drawing when taking an automatically controlled time exposure.

In order to take flash photographs as hereinafter described the change-over switch $S_3$ is operable to contact a second stationary contact FM thereof in series with a fixed resistor $R_4$ in series with a trigger-switch $S_2$ so that the exposure control circuit can establish a fixed time constant for taking a flash photograph or exposure with the open period of the shutter exactly controlled by the fixed time constant.

The change-over switch $S_3$ is mechanically interlinked to a second change-over switch $S_5$ having stationary contacts designated similarly to those of the first change-over switch. In the position of the movable contact of the second change-over switch $S_5$ illustrated in the drawing this switch is positioned for effecting a time exposure automatically controlled under control of the light-responsive cell 1 as hereinafter described. When the first change-over switch $S_3$ is shifted over to a flash mode of operation, the second change-over switch $S_5$ is shifted over to its flash mode contact placing in circuit a flash device 2, having terminals 3 connected thereto, for effecting flash exposures.

A connecting switch $S_4$ is provided for connecting in circuit comprising a second switching circuit and an indicating lamp L; a warning and indicating circuit as hereinafter described. This connecting switch is provided with a movable contact connected to a junction between the comparison resistor $R_3$ and the first change-over switch $S_3$. The movable contact of the switch is at a neutral position NC when the camera is in readiness for taking an exposure. The movable contact thereof is operated to a position W when the release button of the camera, not shown, is operated, thereby applying a voltage divided by the comparison resistor $R_3$ and the photoconductive element 1 to the second switching circuit first transistor $TR_3$ in series with a second transistor $TR_4$ having its emitter connected to a voltage divider $R_5, R_6$. As the release lever mechanism continues its movement actuated by continued depression of the release button, the connecting switch is moved to its operating position contact designated $O_p$ which is the mode in which this switch is positioned when an exposure is being taken, i.e. the shutter is open.

As mentioned heretofore, the drawing illustrates the built-in circuit in a condition in readiness for effecting automatically controlled time exposures. When the camera release button is depressed, associated release mechanism, for example a release lever and associated elements, not shown, closes the power switch $S_1$ and the continued movement of the release mechanism operates shutter mechanism, not shown, that opens the shutter and opens the trigger-switch $S_2$. The latter is closed when the shutter closes. The release lever during the actuation thereof has moved the connecting switch $S_4$ movable contact to its warning or W position in which the divided voltage of the voltage divider consisting of the comparison resistor $R_3$ and the photoconductive element 1 is applied to the first transistor $TR_3$ of the second switching circuit. In the event that the object or the field being photographed is relatively dark and the brightness does not reach a specified value or level for effecting adequate time exposures, the two series transistors of the second switching circuit are rendered conductive and an alarm indication lamp L, connected to the collector of the first transistor of the second switching circuit, is energized thereby visually advising or notifying the operator that time exposures cannot be adequately automatically effected and that a flash photography mode must be established.

The continued movement of the release button to a fully depressed position operates the connecting switch to its operating position $O_p$ and the comparison resistor $R_3$ is short-circuited and the photoconductive element 1 is connected directly to the power source through the change-over switch $S_3$. The shutter opening mechanism is actuated and it opens the trigger-switch $S_2$ and closes the synchro-contact switch Sy so that as long as the shutter is open, the synchro-contact switch Sy is maintained closed and the indicating lamp lights up indicating that the shutter is open. Closing of the shutter by its operating mechanism opens the synchro-contact switch Sy. During this period the photoconductive cell has controlled the charge of the capacitor C to control the timing of the energization of the electromagnet Mg thereby controlling the timing of the activation of the shutter to a closed position so that the time exposure is timed or controlled.

In the event that the photoconductive element 1 has sensed that the object being photographed has a brightness to allow a controlled time exposure, the exposure will be adequate and the connecting switch when being connected to the warning position W will not indicate the need for the use of a flash photography mode. Thus when the shutter closes at the time of the controlled exposure period, which is controlled as a function of the brightness of the scene or object being photographed, the light will turn off.

If the brightness level is too low, the indicating lamp will have temporarily lighted delivering a warning to the camera user or operator, as before described, to use flash photography for effecting an exposure. The operator will then simply shift the change-over switch $S_3$ to a flash mode and the second change-over switch $S_5$ will be simultaneously shifted over to its flash mode placing in circuit the flash device in readiness for taking a flash photograph. The flash device may be a flash gun or any of the other known flash devices which effect a light emission simultaneously with the taking of an exposure. With the switches in this mode the photoconductive element is taken out of circuit of the timing circuit and the fixed time constant resistor $R_4$ is placed in circuit.

With the circuit set for taking of a flash exposure when the release button is pressed down, the power switch is closed as before and the connecting switch $S_4$ is operated to its warning position W. Since the brightness level of the object or scene being photographed is too low, the indicating circuit transistors are rendered conductive so that the warning lamp L will deliver a temporary warning signal. When the release button is fully depressed, the connecting switch is at its final operating position Op and the trigger-switch $S_2$ will be opened by the opening of the shutter and the synchro-contact switch Sy will be closed by the shutter-opening mechanism so that the flash device is properly connected in circuit to flash. Since the change-over switch $S_5$ is now in a flash mode, the warning and indicating lamp will not be lighted during the period that the shutter is open for the fixed period controlled by the time constant branch of the control circuit.

Those skilled in the art will understand that the camera release mechanism restores itself and the control-circuit power switch is opened when the shutter closes at the end of an exposure.

We claim:

1. A control circuit for use in a camera having an electrically operated shutter actuated to a closed condition electrically, said control circuit comprising, a switching circuit having a power source and an electrically energized electromagent for controlling in use closing of a camera shutter in a camera, a timing circuit for taking of time exposures having light-responsive means automatically responding in use to brightness of an object being photographed and applying a control signal to the switching circuit for commanding the closing of said camera shutter, a flash circuit comprising a flash device for taking of flash exposures, change-over switch means operable to a first operative position connecting said first timing circuit to said switching circuit for controlling time exposures as a function of the said brightness sensed and operable to a second operative position disconnecting said light-responsive means from said switching circuit and connecting said flash circuit in circuit for taking of a flash exposure, a warning and indicating circuit comprising an indicating device for warning the level of said brightness sensed requires taking of a flash exposure and for indicating the shutter is open during a time exposure and a second switching circuit for controlling energizing of said indicating device, means comprising connecting switch means connecting said warning and indicating circuit in circuit for energizing of said indicating device and said second switching circuit for warning said flash exposure should be taken and indicating the shutter is open, means comprising change-over switch means connecting said light-responsive means to said second switching circuit for biasing said second switching circuit with a reference signal representative of said brightness sensed to render said second switching circuit conductive thereby energizing said indicating device when a flash exposure is required, means comprising synchro-switch means connected in said warning and indicating circuit and in said flash circuit and having means operated in operation to an open position when the shutter is closed an to a closed position when the camera shutter is opened for controlling energizing of said indicating device from said power source through said change-over switch means when said shutter is opened and said change-over switch means is in said first operative position and for activating said flash device through said change-over switch means when said change-over switch is in said second operative position.

2. A control circuit for use in a camera having an electrically operated shutter actuated to a closed condition electrically according to claim 1, in which said indicating device comprises means indicating visually when elctrically energized.

3. A control circuit for use in a camera having an electrically operated shutter actuated to a closed condition electrically according to claim 1, in which said second switching circuit comprises transistors biased by a voltage developed by said light-responsive means and rendered conductive when the brightness sensed by said light-responsive means is below a selected level, thereby energizing said indicating device.

* * * * *